United States Patent
Hur et al.

(10) Patent No.: US 8,339,544 B2
(45) Date of Patent: Dec. 25, 2012

(54) DISPLAY PANEL, THIN FILM TRANSISTOR ARRAY PANEL, AND METHOD FOR REPAIRING DISPLAY PANEL

(75) Inventors: Seung-Hyun Hur, Cheonan-si (KR); Jae-Yong Shin, Suwon-si (KR); Jang-Il Kim, Asan-si (KR); Ji-Hyeon Son, Seongnam-si (KR)

(73) Assignee: Samsung Display Co., Ltd., Yongin (KR)

( * ) Notice: Subject to any disclaimer, the term of this patent is extended or adjusted under 35 U.S.C. 154(b) by 668 days.

(21) Appl. No.: 12/507,309

(22) Filed: Jul. 22, 2009

(65) Prior Publication Data
US 2010/0195026 A1 Aug. 5, 2010

(30) Foreign Application Priority Data
Jan. 30, 2009 (KR) .................. 10-2009-0007697

(51) Int. Cl.
*G02F 1/1335* (2006.01)
(52) U.S. Cl. .................. 349/106; 347/106; 430/7
(58) Field of Classification Search .................. 349/106; 347/106; 430/7
See application file for complete search history.

(56) References Cited

U.S. PATENT DOCUMENTS

| | | | |
|---|---|---|---|
| 6,035,526 A | 3/2000 | Saruta et al. | |
| 6,828,069 B1 | 12/2004 | Nakazawa et al. | |
| 2008/0231681 A1* | 9/2008 | Chen et al. | 347/106 |
| 2009/0035518 A1* | 2/2009 | Wang et al. | 428/141 |
| 2009/0086352 A1* | 4/2009 | Tsao et al. | 359/891 |

FOREIGN PATENT DOCUMENTS

| | | |
|---|---|---|
| JP | 2000-353594 | 12/2000 |
| JP | 2003-043236 | 2/2003 |
| JP | 2006-011244 | 1/2006 |
| JP | 2006-139041 | 6/2006 |
| JP | 2006-154398 | 6/2006 |
| JP | 2007-101809 | 4/2007 |
| JP | 2008-089624 | 4/2008 |
| JP | 2008-145828 | 6/2008 |
| KR | 1020060001167 | 1/2006 |

* cited by examiner

*Primary Examiner* — Huyen Ngo
(74) *Attorney, Agent, or Firm* — H.C. Park & Associates, PLC

(57) ABSTRACT

An exemplary embodiment of the present invention relates to a display panel having a plurality of pixels, the display panel including a first substrate, and a color filter including a plurality of first color filters disposed on the first substrate and a second color filter having a black color and disposed in the same layer as the first color filters.

14 Claims, 7 Drawing Sheets

DISPLAY PANEL, THIN FILM TRANSISTOR ARRAY PANEL, AND METHOD FOR REPAIRING DISPLAY PANEL

CROSS REFERENCE TO RELATED APPLICATION

This application claims priority from and the benefit of Korean Patent Application No. 10-2009-0007697 filed on Jan. 30, 2009, which is hereby incorporated by reference for all purposes as if fully set forth herein.

BACKGROUND OF THE INVENTION

1. Field of the Invention

Exemplary embodiments of the present invention relate to a display panel, a thin film transistor array panel, and a method for repairing a display panel.

2. Discussion of the Background

A liquid crystal display (LCD) is one of the most widely used flat panel displays (FPD), and it includes two display panels on which field generating electrodes, such as pixel electrodes and a common electrode are formed, and a liquid crystal layer interposed between the two display panels. In the LCD, voltages are applied to the field generating electrodes so as to generate an electric field over the liquid crystal layer, and the alignment of liquid crystal molecules of the liquid crystal layer is determined by the electric field. Accordingly, the polarization of incident light is controlled, and thereby an image may be displayed.

The LCD also includes switching elements connected to the respective pixel electrodes, and a plurality of signal lines such as gate lines and data lines for controlling the switching elements and applying voltages to the pixel electrodes.

However, a white defect in which a pixel is brightly displayed may be generated due to various factors occurring during the LCD manufacturing process, and the white defect is easily recognized by a viewer. Accordingly, the pixel may be repaired in which the white defect is changed into a black defect, such that the pixel is always displayed as black so as to not be recognized by the viewer.

At present, to change the defective pixel to the black color, a method in which a repair signal line or a storage electrode line is formed in the pixel and the pixel electrodes are shorted through a laser is used.

However, the success rate of the short using the laser may be decreased as the width of the signal line is decreased.

SUMMARY OF THE INVENTION

Exemplary embodiments of the present invention provide a method for repairing a display panel by changing a white defect into a black defect without the use of the laser.

Additional features of the invention will be set forth in the description which follows, and in part will be apparent from the description, or may be learned by practice of the invention.

An exemplary embodiment of the present invention discloses a display panel including a plurality of pixels, the display panel including a first substrate, and a color filter including a plurality of first color filters disposed on the first substrate and a second color filter having a black color and disposed in the same layer as the first color filter.

An exemplary embodiment of the present invention also discloses a thin film transistor array panel including: an insulation substrate; a plurality of gate lines disposed on the substrate; a plurality of data lines crossing the gate lines; a plurality of thin film transistors connected to the gate lines and the data lines; and a color filter including a plurality of first color filters disposed on the first substrate and a second color filter having a black color and disposed in the same layer as the first color filter.

An exemplary embodiment of the present invention also discloses a method for repairing a panel that includes removing a portion of a color filter from a substrate comprising the color filter to form an empty space, and filling a black color ink in the empty space to form a second color filter.

According to an exemplary embodiment of the present invention, a black color ink is used such that a pixel defect may be repaired even though a width of the signal line is reduced.

Also, according to an exemplary embodiment of the present invention, the black color pixel is formed through the method described above such that contamination of an adjacent cell by the black color ink may be prevented, and thereby a high quality LCD may be provided.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the present invention, and together with the description serve to explain the principles of the invention.

DETAILED DESCRIPTION OF THE ILLUSTRATED EMBODIMENTS

Figure 1:
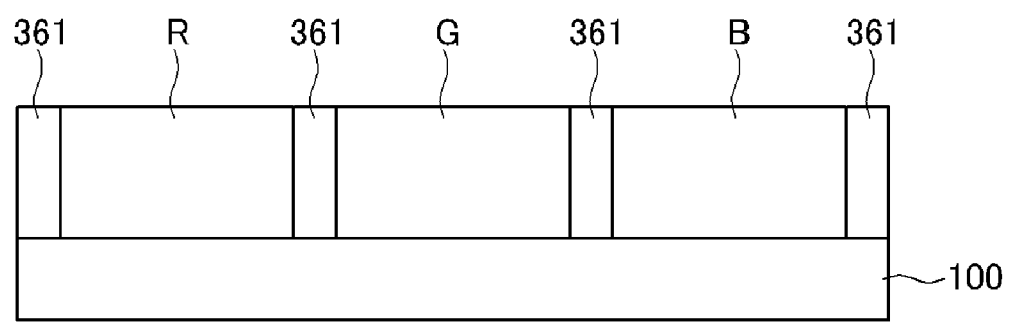
FIG. 1, FIG. 2, and FIG. 3 are cross-sectional views sequentially showing a method for repairing a defect pixel in an LCD according to an exemplary embodiment of the present invention.

The invention is described more fully hereinafter with reference to the accompanying drawings, in which exemplary embodiments of the present invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
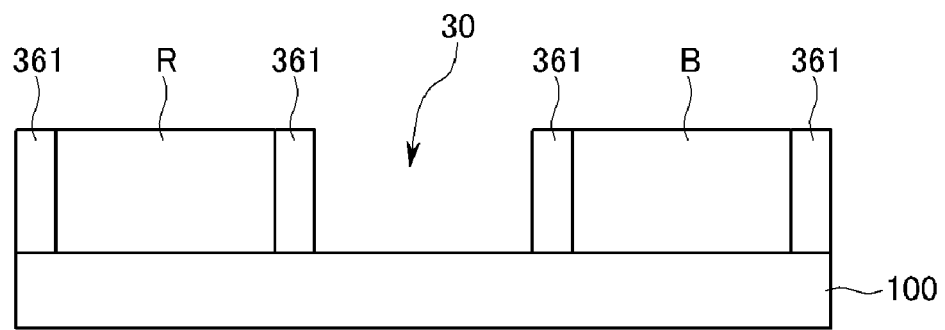
Figure 3:
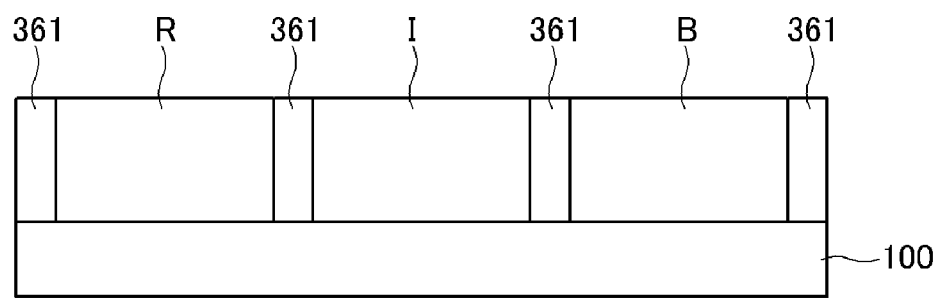
Figure 4:
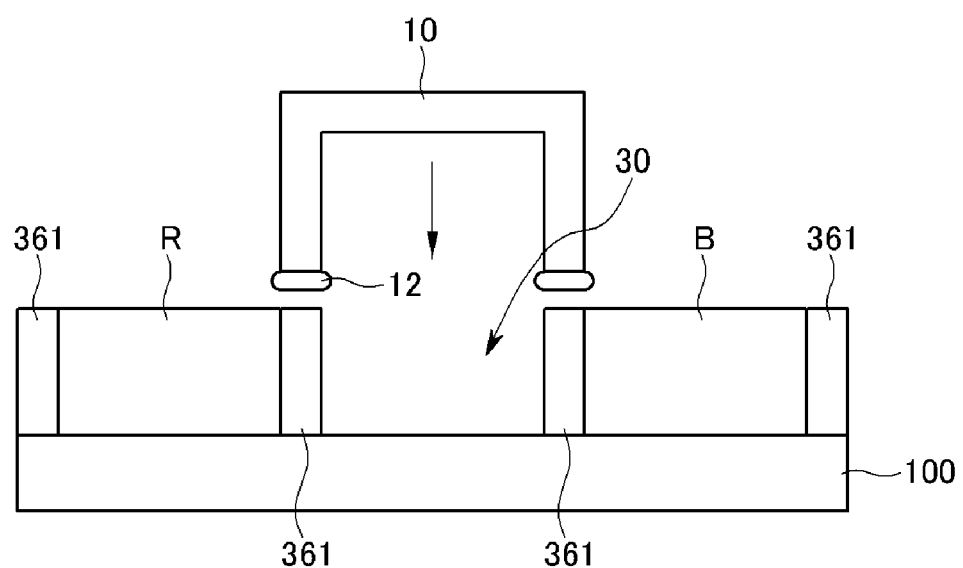
FIG. 4 and FIG. 5 are views for explaining a contact printing method according to an exemplary embodiment of the present invention.
Figure 5:
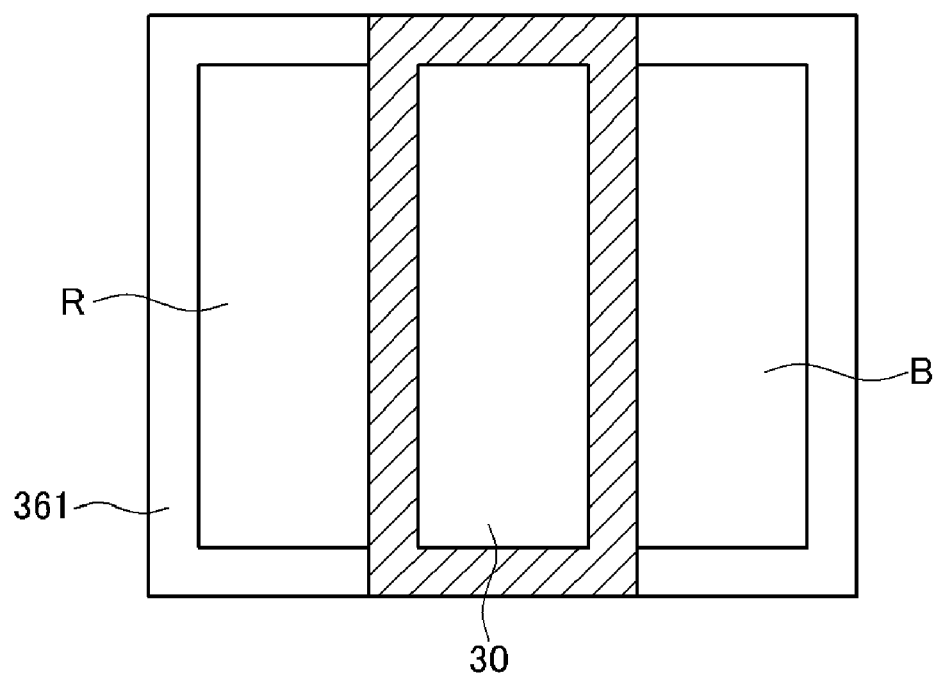

FIG. 1, FIG. 2, and FIG. 3 are cross-sectional views sequentially showing a method for repairing a defect pixel in an LCD according to an exemplary embodiment of the present invention. FIG. 4 and FIG. 5 are views for explaining a contact printing method according to an exemplary embodiment of the present invention.

As shown in FIG. 1, a substrate includes a plurality of red color filters R, green color filters G, and blue color filters B. The color filters R, G, and B are arranged in a matrix (not shown). Each of the color filters R, G, and B may be formed in a pixel defined by a partition 361. The partition 361 may be omitted, and the color filters R, G, and B may directly contact each other. In an exemplary embodiment of the present invention, red, green, and blue color filters are exemplified, however each color filter may be represented as any color that can be formed for the pixel of the display device.

One pixel of the color filters R, G, and B formed on the substrate 100 may have a white defect in which a gate line or a data line and a pixel electrode are shorted to each other (not shown) such that the pixel is represented as white when the display device displays a black color. For convenience of explanation, in an exemplary embodiment of the present invention, the pixel including the green color filter G is referred to as the defect pixel.

As shown in FIG. 2, the color filter of the pixel formed with the green color filter G is removed by using a laser.

Next, a hydrophobic treatment is executed for the partition 361 of an empty pixel 30 at which the color filter has been removed. The hydrophobic treatment may be a plasma treatment, contact printing, or Inkjet printing.

In the plasma treatment, the surface of the partition 361 is treated by plasma generated through a gas including fluorine (F), such as $CF_4$ or $SF_6$, such that the surface of the partition 361 becomes hydrophobic.

In the contact printing method, as shown in FIG. 4, a stamping member 10 is soaked in a solvent 12 having a hydrophobic property, and then the stamping member 10 adhered with the solvent 12 is contacted with the surface of the partition 361 at the empty pixel 30 such that the solvent having the hydrophobic property remains on the surface of the partition 361. The hydrophobic solvent includes a siloxane group, and for example may be polydimethylsiloxane (PDMS).

As shown in FIG. 5, the plane pattern of the stamping member 10 is the same plane pattern as that of the partition (shown as the slashed portion) enclosing the empty pixel 30.

In the Inkjet printing method, a hydrophobic solvent is dripped and dried while moving an Inkjet head such that the hydrophobic solvent is partially printed on the surface of the partition 361 enclosing the empty pixel 30.

As shown in FIG. 3, an amending color filter I is formed in the empty pixel 30 through the Inkjet printing method. The amending color filter I includes a black color pigment.

As shown in FIG. 2, in an exemplary embodiment of the present invention, the partition of the empty pixel 30 is applied with the hydrophobic treatment. Spreading of the amending color filter I to a neighboring pixel due to the repulsive force between the partition 361 and the amending color filter I may therefore be prevented. Contamination of the neighboring pixel when dripping the amending color filter I may also be prevented. Accordingly, a decrease of the color reproducibility of the display panel may be prevented.

A method for manufacturing a display panel using this repair method will be described below.

First, a display panel according to an exemplary embodiment of the present invention will be described with reference to FIG. 6.

Figure 6:
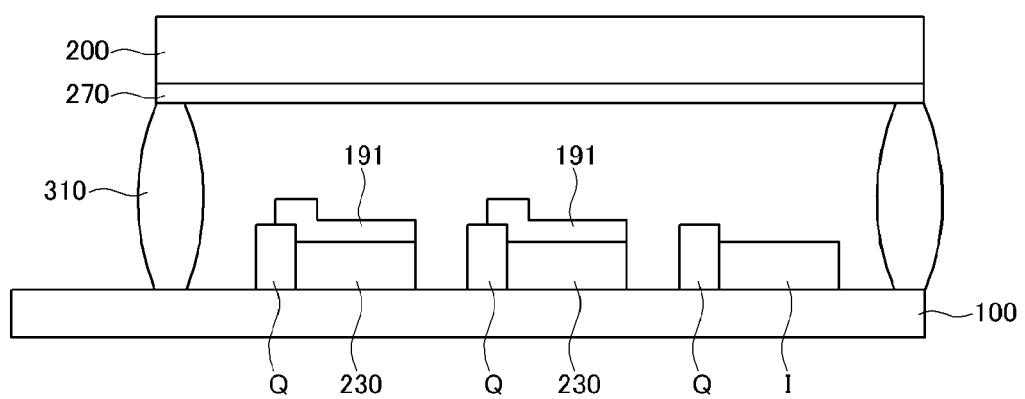
FIG. 6 is a cross-sectional view of an LCD of the present invention.

FIG. 6 is a cross-sectional view of an LCD of the present invention.

An LCD according to the present invention includes a lower panel 100 and an upper panel 200 facing each other, and a liquid crystal layer (not shown) interposed between the two display panels 100 and 200. The liquid crystal layer is enclosed by a sealant 310.

The lower panel 100 includes a gate line, a data line, and a thin film transistor Q, and a pixel electrode 191 connected thereto, that are formed on a transparent insulation substrate.

Also, pixels of the lower panel 100 include a plurality of color filters 230 formed through the Inkjet printing method. The color filter 230 is one of a red, a green, and a blue color filter. Here, one pixel as the repaired pixel does not include the pixel electrode 191, and includes the amending color filter I that is made of the black color ink.

The upper panel 200 is made of a transparent insulation substrate, like the lower panel 100, and a common electrode 270 is formed on the insulation substrate 200.

A manufacturing method of the above-described LCD shown in FIG. 6 will be described with reference to FIG. 7.

Figure 7:
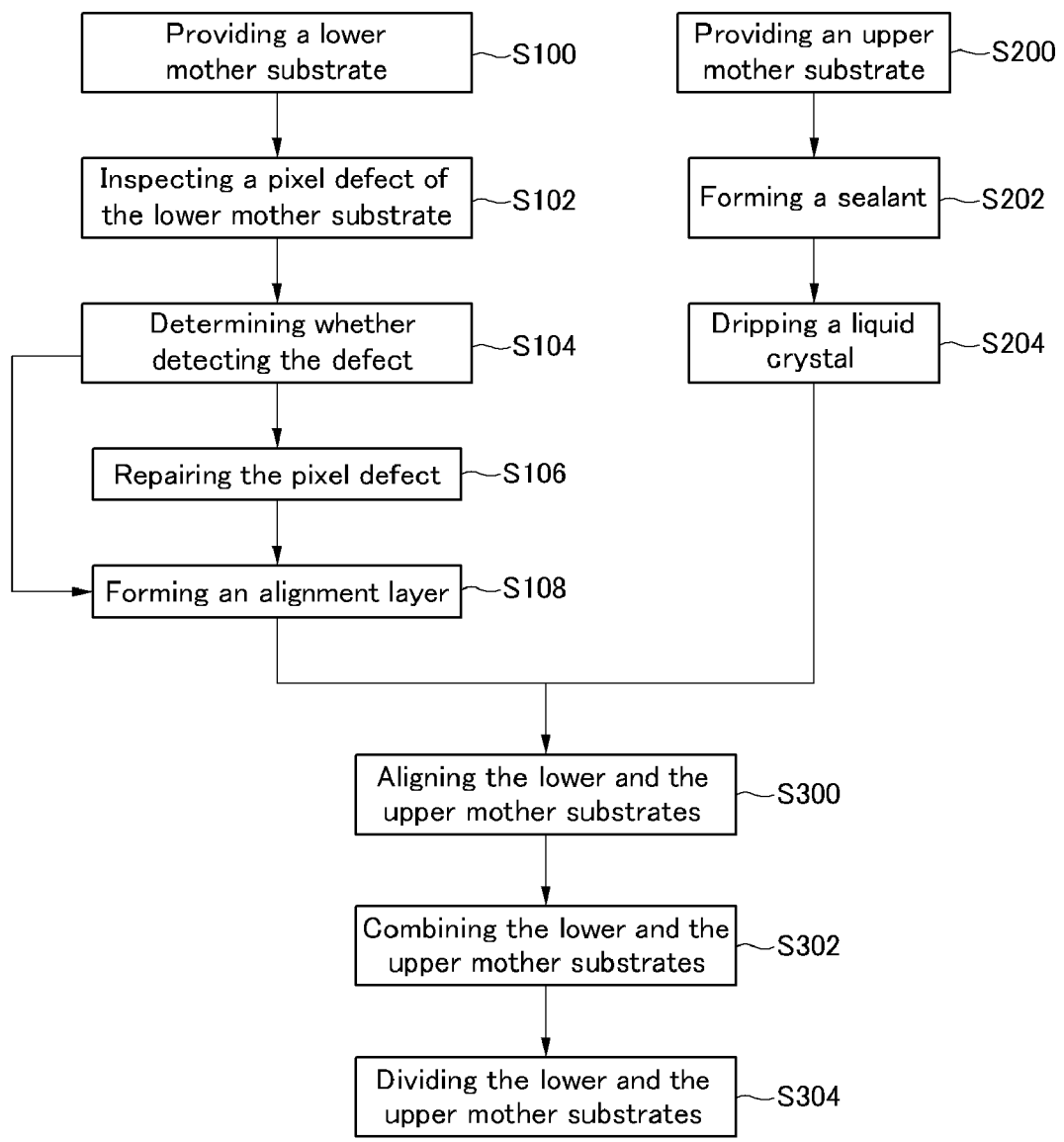
FIG. 7 is a flowchart for explaining a manufacturing method of an LCD.

FIG. 7 is a flowchart explaining a manufacturing method of an LCD.

First, as shown in FIG. 7, lower and upper mother substrates are completed through corresponding processes (S100 and S200). The lower mother substrate may include a plurality of the lower panels shown in FIG. 6, and the upper mother substrate may include a plurality of the upper panels shown in FIG. 6.

An inspection for detecting a defect of the pixels formed on the lower mother substrate is executed (S102). In the inspection, a signal for the display device to display a black color may be input, and a defect due to a short of the pixel electrode or the channel is detected through a white defect in which light is leaked.

Next, it must be determined whether a defect pixel has been detected (S104). If a defect pixel is not detected, a process for forming an alignment layer as a next step is executed (S108), but if a defect pixel is detected, a process for repairing the detected defect pixel is executed (S106).

The detected defect pixel may be repaired through the method for repairing the pixel of the LCD shown in FIG. 1, FIG. 2, FIG. 3, FIG. 4, and FIG. 5.

That is, the pixel electrode, the insulating layer, and the color filter formed in the detected defect pixel are all removed by using a laser. Also, as shown in FIG. 2, the hydrophobic treatment process is applied to the surface of the partition enclosing the defect pixel. Therefore, the surface of the partition may be hydrophobic. Next, as shown in FIG. 3, the amending color filter I is formed in the empty pixel through the Inkjet printing method.

The amending color filter I includes the black color pigment such that the defect pixel may be recognized as a black color even if the white defect is generated.

An alignment layer is formed on the repaired substrate (S108).

Further, the upper mother substrate of the exemplary embodiment of the present invention includes a common electrode and an alignment layer. Next, a sealant defining a region at which the liquid crystal is filled is formed in the upper mother substrate (S202).

The sealant may be made of a material that is hardened by light, for example ultraviolet (UV) light. A liquid crystal material is dripped in the region enclosed by the sealant (S204).

The upper and lower mother substrates are aligned (S300). The sealant is then hardened through the irradiation of the UV light to combine the upper and lower mother substrates (S302).

The combined mother substrates are then divided into a plurality of liquid crystal cell units (S304).

In the above-described exemplary embodiment, the color filters are formed on the lower mother substrate. However the color filter may alternately be formed on the upper panel. Accordingly, if the defect pixel is detected on the lower mother substrate, the color filter of the upper mother substrate corresponding to the defect pixel of the lower mother substrate is removed, and the amending color filter is formed on the upper mother substrate.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for repairing a panel, comprising:
   removing at least a portion of a first color filter from a substrate comprising the first color filter to form an empty space; and
   filling a black color ink in the empty space to form a second color filter.

2. The method of claim 1, further comprising hydrophobic-treating a circumference of the empty space.

3. The method of claim 2, wherein the hydrophobic-treating is one of a plasma treatment, Inkjet printing, and contact printing.

4. The method of claim 3, wherein the plasma treatment comprises using $SF_6$ or $CF_4$.

5. The method of claim 3, wherein the contact printing comprises:
   contacting a stamping member to a hydrophobic solvent so that the hydrophobic solvent is adhered to the stamping member; and
   contacting the stamping member adhered with the hydrophobic solvent to the circumference of the empty space.

6. The method of claim 5, wherein the hydrophobic solvent comprises siloxane.

7. The method of claim 5, further comprising:
   forming a partition dividing the substrate into a plurality of regions; and
   forming the first color filter in a region divided by the partition, wherein the partition encloses the empty space, and the plane shape of the stamping member is the same as the plane shape of the partition enclosing the empty space.

8. The method of claim 7, wherein the hydrophobic solvent comprises siloxane.

9. The method of claim 8, wherein the hydrophobic solvent comprises polydimethylsiloxane.

10. The method of claim 1, further comprising:
    forming a partition dividing the substrate into a plurality of regions; and
    forming the first color filter in a region divided by the partition.

11. The method of claim 10, further comprising hydrophobic-treating a circumference of the empty space, wherein, in the hydrophobic-treating of the circumference of the empty space, the hydrophobic-treating is applied to the partition.

12. The method of claim 1, further comprising:
    forming a gate line, a data line crossing the gate line, and a thin film transistor connected to the gate line and the data line on a substrate;
    forming the first color filter on the substrate; and
    forming a pixel electrode on the first color filter.

13. The method of claim 12, wherein forming the first color filter on the substrate comprises:
    forming a partition dividing the substrate into a plurality of regions; and
    forming the first color filter in the region divided by the partition.

14. The method of claim 13, further comprising hydrophobic-treating a circumference of the empty space, wherein in the hydrophobic-treating of the circumference of the empty space, the hydrophobic-treating is applied to the partition.

* * * * *